June 13, 1933. R. E. NAUMAN 1,913,719
APPARATUS FOR DETERMINING THE QUANTITY AND QUALITY OF LIGHT
Filed March 30, 1926   2 Sheets-Sheet 1
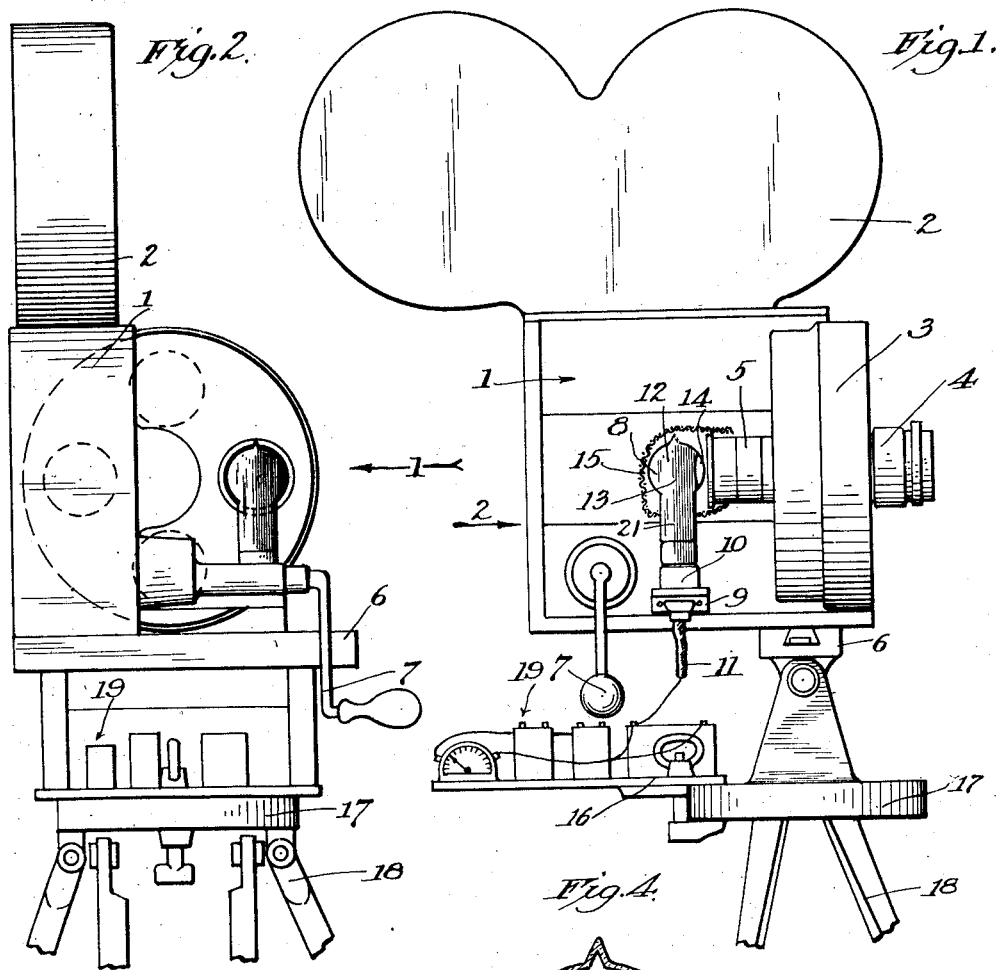
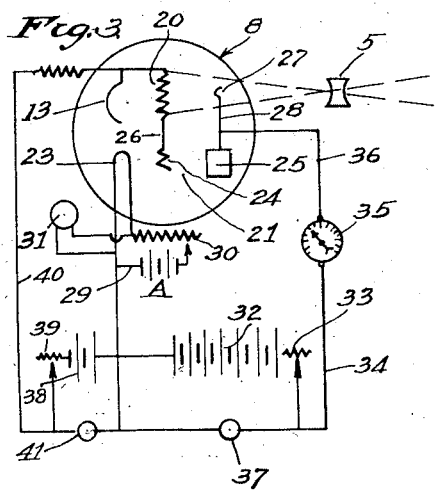
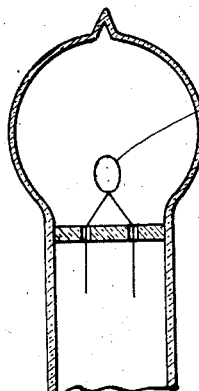
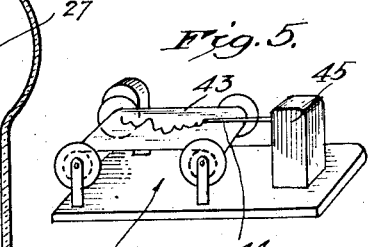
Inventor:
R. E. Nauman June 13, 1933.   R. E. NAUMAN   1,913,719
APPARATUS FOR DETERMINING THE QUANTITY AND QUALITY OF LIGHT
Filed March 30, 1926   2 Sheets-Sheet 2

Inventor:
R. E. Nauman
by Hazard and Miller
Atty.

Patented June 13, 1933

1,913,719

UNITED STATES PATENT OFFICE

ROGER E. NAUMAN, OF LOS ANGELES, CALIFORNIA, ASSIGNOR OF ONE-HALF TO HAROLD W. NAUMAN, OF LOS ANGELES, CALIFORNIA

APPARATUS FOR DETERMINING THE QUANTITY AND QUALITY OF LIGHT

Application filed March 30, 1926. Serial No. 98,507.

My invention is an apparatus for determining the quantity and quality of light which I have designated as a cine-spectrometer and have perfected the method of using and applying same in the theatrical, photographic and motion picture industry; in the taking of any kind of photographs, developing the negatives, printing the positives and in the showing of pictures in theatres.

My cine-spectrometer is an instrument for reading and analyzing light as pertaining to objects such as in moving pictures.

One object of my invention is the development of a scientific and accurate manner of operation in the moving picture industry, from the taking of the pictures to the showing of them to the public.

In each and every distinctive step in this procedure, light is required, being first used in taking the photograph and from data thus secured the developing is accurately controlled. The control of light is an important factor in the printing of the positive film from the negative and on the control of light in a picture projector is dependent to a great extent the satisfactory representation of the picture.

Under the present practice of taking moving pictures or in fact photographs of any nature, there is no accurate and scientific way of measuring the quantity of light combined with what might be termed its quality from a photographic standpoint, independent of the comparison by the eye or skill in the art of photography.

There are various light registering devices used in photography such as sensitized material or the like which may be exposed to light for a certain definite time, thereby to a certain extent giving an idea of relative illumination, but this must be compared with a standard and is dependent upon the eye.

There is no definite procedure for determining the quantity and the quality of light which passes through a camera lens and affects photographically the film on which the scene is photographed. As most of the devices used as aids to the photographer or camera man in determining the photographic value of light consume considerable time and also depend on his judgment, they are rarely used, the skill of the camera man in motion pictures being relied upon to obtain a satisfactory result.

It is well known in the moving picture industry that there are many failures in this, even with highly experienced camera men in misjudging light, the color effects of a particular setting, the time of exposure, etc., and this independent of any mistakes which may occur in the developing and printing of the pictures.

In all photography, especially as applicable to moving pictures, it is well known that the different colors of objects, have a material effect on the resulting picture. As some objects photograph much quicker than others, even when films are used which are more or less sensitive to the whole range of the spectrum, although it is rare that full panchromatic films are used, and as the colors which photograph poorly are those to which the eye is most sensitive and those colors which photograph readily are colors to which the eye is more or less insensitive, a person cannot readily judge the photographic value of light being reflected from a scene in order to accurately operate a camera in taking motion pictures to secure uniform results. For instance, the lights of short wave length such as the violet, the invisible ultra-violet and the indigo are very actinic in their photographic powers and may be termed photographically positive colors. The eye however is not every sensitive to these colors, the ultra-violets not registering on the retina as colors. The orange and red of much longer wave-length which may be designated as photographically negative colors, do however, impress the eye and cause a person to misjudge the photographic effect of any definite scene having these colors incorporated with others.

Objects of the various colors of the spectrum may be satisfactorily photographed on a time basis, giving the photographically negative colors a longer exposure than the photographically positive colors, but as a rule this is not possible in moving pictures as these have to be photographed a certain definite number of exposures per second, usually about sixteen and in various scenes the colors present different proportions.

Most of the devices for indicating the photographic value of light are not adapted to use in registering the light reflected from any particular scene and as it is difficult for a camera man to properly estimate the light, my cine-spectrometer may be utilized to obtain definite recordable values from a photographic standpoint.

The construction and operation of my cine-spectrometer will be first described in its application to the manual manipulation of cameras; its secondary application in the developing of films; its manual application in printing and the procedure in recording the proper light for projecting pictures.

My cine-spectrometer as an instrument comprises a photo-electric cell which may be properly mounted to receive light having various electric circuits for energizing the cell and preferably amplifying the currents as affected by the resistances and the electron flow developed in the cell and in conjunction therewith a meter which may be utilized to register the quantity and photographic quality of the light. This meter may be self-recording if desired. The photo-electric cell may have any suitable light sensitive surface utilizing selinum or some of the so-called alkali metals such as potassium, sodium, lithium, cæsium, rubidium, etc. However, as the photo-electric cells may be readily purchased on the market, I have found it satisfactory to use a cell sold under the trade name of Radiotron U. X. 112 tube. This combines photo sensitive materials with a triode tube for developing an electron flow and amplifying to a certain extent.

In the taking of moving picture photographs the moving picture camera is usually provided with a rotatable turret having four lenses having photographic qualities. When focusing a camera the lens to be used presents an image to one side of the camera proper, the camera being shiftable laterally so that an exact focus may be obtained in the position in which such image will register on the film, when the camera is replaced in photographic position and the turret turned for taking a picture. In the camera I preferably mount the photo-electric cell in such a position as to have the image cast thereon and therefore obtain the full light value from a quantity and quality standpoint as it would be recorded on the film. Then by reading the meter or noting the automatic recording meter the camera man or his assistant will note the reading defining the quantity of light. Although the meter I use is in effect a milli-ampere meter, it may be graduated in units defining certain established quantities of light. I may if desired use such quantities as are equivalent to the so-called units of lumens or other arbitrary values.

In the manual or automatic manipulation of cameras in accordance with my method, it is necessary to have a table or chart prepared showing the proper iris opening for the camera and time of exposure for different units of light as recorded by the meter. Therefore the camera man after properly focusing the scene and noting the meter reading caused by the photo-electric cell will set the iris to the designated value, or the iris may be automatically operated, and the shutter to be operated the proper speed, and thus may take the photographs on a scientific basis independent of judgment of light values and such like by the eye.

A reel in being taken has recorded thereon the light value at the time of taking. In the developing of the film a developer having a certain formula and time of development will be utilized in accordance with another prepared table or chart showing the photographic solutions required, temperature of same and time of development for films taken under certain known units of light value.

In printing the negative a standard light is shone therethrough on to my cine-spectrometer in order to obtain the light value transmitted through the film. In reality this measures the relative density of different films. I may either use a standard light such as utilized in the printing or a separate standard light which will give a known reading. A set of tables or charts prepared from films of standard density as recorded on the meter through the electric fluctuations caused by the light on the photo-electric cell as shining through films is then utilized to determine the iris opening of the printing lamp and the voltage required for such lamp. The light used in printing may be varied by changing the iris opening through which the light passes through the negative or by changing the intensity of the light.

In the projection of moving pictures the quality of the picture is dependent very much on the light in the projector and also on the reflective qualities of the screen. Therefore I use my cine-spectrometer in the theatres for reading the quantity of light as reflected from screens and therefore determine the intensity of light required in the projector to give a certain definite standard result, and making it possible for studios to use a standardized density for all released prints.

My invention in its several phases as an intrument and a method of procedure will be more readily understood from the following description and drawings, in which;

Figure 1 is a side elevation taken in the direction of the arrow 1 of Fig. 2, showing a moving picture camera with my cine-spectrometer mounted thereon in position for recording the quantity and photographic quality of light from a scene to be photographed Fig. 2 is a rear elevation of the camera taken in the direction of the arrow 2 of Fig. 1.

Fig. 3 is a diagramatic view of a photoelectric cell incorporated with a triode valve, the electric circuits therefor and an indicating meter.

Fig. 4 indicates diagrammatically the light sensitive portion of a standard photo-electric cell.

Fig. 5 indicates diagrammatically a self-recording meter for indicating the quantity and photographic quality of light.

Figure 6:
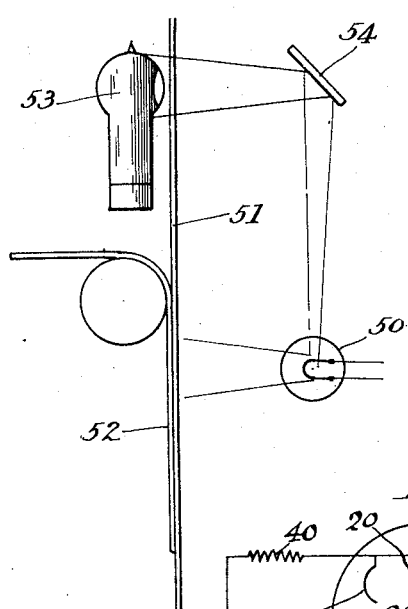

Fig. 6 is a diagram of a mounting for my cine-spectrometer in printing from negatives, utilizing the light from a standard printing lamp.

Figure 7:
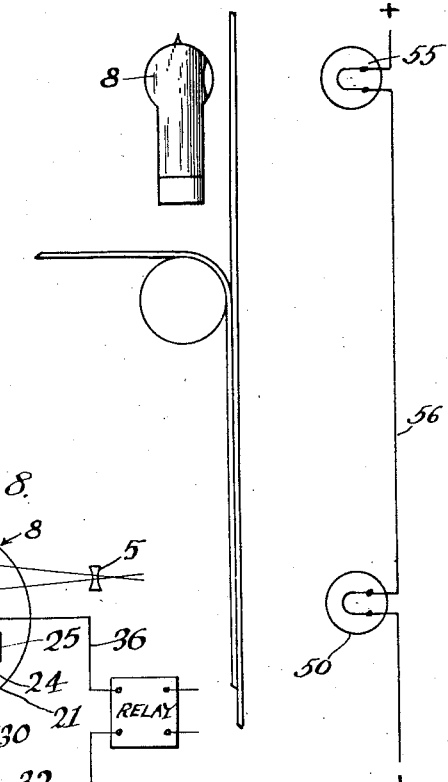

Fig. 7 is a mounting alternative to Fig. 6, utilizing two standard lamps, one for printing and the other for measuring the light through the negative, both lamps being on the same circuit.

Figure 8:
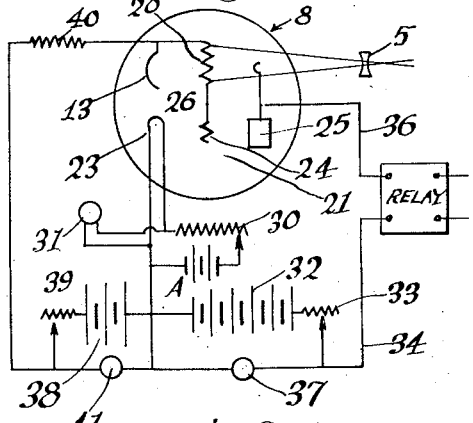

Fig. 8 is a diagram of a circuit similar to Fig. 3, suitable for recording such light, and operating a relay.

Figure 9:
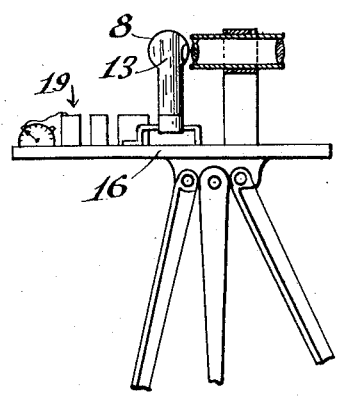

Fig. 9 is an elevation partly in section of my cine-spectrometer separately mounted on a stand and showing it usable as a separate instrument for recording the quantity of light as for measuring the intensity of reflected light from a theatre screen, painted surfaces for mixing paint etc.

The adaptation of my cine-spectrometer to a camera is substantially as follows, having reference particularly to Figs. 1 and 2.

The camera is designated generally by the numeral 1, having a magazine 2 for the films and a rotary turret 3 having lenses 4 mounted thereon. A focusing lens 5 is secured on one side of the camera so that when the camera is shifted laterally on the track 6 any particular lens through which it is desired to photograph may be positioned in register with the focusing lens 5. The ordinary crank for winding the films and taking the photograph is illustrated by the numeral 7.

The above description and drawings designate a well known standard type of camera, but it is to be understood that my cine-spectrometer may be applied to other types and makes of cameras by having the mounting as desired.

A photo-electric cell 8 which may be of a standard type or specially constructed for use with cameras is mounted on a bracket 9, this latter being preferably secured to one side of the camera, the bracket having a socket 10 whereby the lamp makes the proper electrical connections through a lead conduit 11.

The photo-electric cell generally is formed with a glass bulb 12 at the end having a silver coating indicated by the numeral 13 with a window 14 through which the light enters. This window will be placed directly in the path of the light so that the image will be cast inside the bulb and therefore the cell will be affected by the total quantity of light which would photographically impress itself on the film were a picture being taken. A hood 15 of light-proof flexible material is utilized to cover the focusing lens and the photo-electric cell to exclude external light.

For purposes of illustration I have indicated the various batteries or sources of electrical power as being mounted on a table 16 secured to a cap 17 on the tripod 18. These instruments are designated generally by the numeral 19 and are better described in connection with the diagrams.

Referring to Fig. 3, a suitable circuit and diagrammatic mounting of a photo-electric cell is indicated by the numeral 8, the reflector by the numeral 13, a light sensitive material by the numeral 20, the focusing lens being designated by the numeral 5. The triode elements of a tube are designated by the numeral 21 and are usually placed in the lower end of the tube and screened from the photo-electric material by a partition.

These elements comprise a filament 23, a grid 24 and a plate 25. The grid is connected by an electric lead 26 to the light sensitive material 20. The plate 25 is connected to a ring 27 situated in the path of electrons flowing in the light beam; the ring and plate being electrically connected by a lead 28.

An A battery 29 usually of about 4½ volts is connected through a variable resistance 30 to the filament and has a volt meter 31 connected to the circuit. A B battery 32 which may be of 90 to 500 volts is connected to the filament circuit and through a variable resistance 33 by a lead 34, through a meter 35 and by a lead 36 to the plate and ring, being electrically connected to the lead 28.

As above mentioned the meter 35 is in reality a milli-ampere and may be so graduated or graduated in arbitrary units of light. A volt meter 37 is in this work circuit of the B battery. A C battery 38, which may be of 45 volts is connected through a variable resistance 39 and the lead 40; a resistance to the light sensitive material 20 and hence to the grid 24. This circuit has a volt meter 41.

The action of the above circuits in connection with the photo-electric cell is substantially as follows:

On increase or decrease of light the light sensitive material not only changes its resistance but causes an electron flow which varies the flow of electrons between the filament 23 and the plate 25 and hence varies the current in the work circuit indicated by the meter 35. If the changes of current are weak due to the effect of increasing or decreasing light, such factors may be compensated for by a sensitive adjustment of the meter by utilizing additional amplifying circuits if desired. I do not illustrate herein any external amplifying circuit as these are well known and commonly utilized in the radio, telephone and such arts.

In Fig. 5 I indicate a recording meter designated generally by the numeral 42, having a moving web of material 43 with a pencil 44 actuated by a meter 45; this arrangement usually requiring an amplifying circuit to actuate the meter 45.

The manner of using my cine-spectrometer as above described is substantially as follows:

The camera is focused on the scene to be taken in the usual manner, it being presumed that the lighting or the like is sufficient. The photo-electric cell is then placed behind the focusing lens and the amount of light received thereon interpreted by reading the meter 35 or a self-recording meter. If the light reflected from the scene is not sufficient or too much, if an in-door scene, the light may be changed. By utilizing a prepared table or chart the camera man then sets the iris of the camera and the shutter regulating mechanism in accordance with the setting designated corresponding to the amount of units of light designated on the meter. He may then photograph the scene, knowing that the camera is properly and scientifically adjusted to obtain the best results.

After a reel has been taken this is marked with insignia designating the light units under which it was photographed. If a reel has been used for several different scenes having different units, these would be indicated by suitable markings to give the proper information in the developing laboratory.

The present practice of developing is for the laboratory men to take several sections of a film and develop these for different lengths of time, examining the negatives to see which is most satisfactory and then developing the whole film accordingly. As this procedure is dependent on the judgment of the eye it is very faulty.

Presuming with my meter that the camera indicates say, four units of light in taking a picture and a developing table shows that this would require a number 6 developing procedure, which would be utilizing a standard developer at a definite temperature for a fixed period of time, and presuming that another film showed that a 3.5 light unit had been used and the table indicated that this would require 6.5 units in developing, the developing may be done accurately without prior experimentation and thus for different lights used in photographing obtaining substantially standard negatives in accordance with such light quantities.

The printing of the film may be regulated substantially as follows, having reference particularly to Figs. 6 and 7:

These figures do not attempt to indicate the structural details of printing machines, but merely some of the essential features. A printing lamp is designated by the numeral 50, the negative by the numeral 51, the positive film by the numeral 52; the light passing through the negative and printing on the positive in the usual manner. In order to record the density of the negative, I mount my spectrometer designated by the photo-electric cell 53 so that light reflected from a mirror 54 and passing through the negative affects the photo-electric cell and hence the meter of the cine-spectrometer; such construction being indicated in Fig. 6 utilizing the circuits of Fig. 8.

As it would require considerable change of most printing machines to install a reflector to project some of the light from the printing lamp through the negative, for some types of printing machines I find it of advantage to utilize a second standard lamp 55 which projects through the negative directly on to the photo-electric cell. This lamp and the printing lamp 50 are preferably in the same circuit indicated by the numeral 56 so that any fluctuation in one lamp due to changes of voltage gives a fluctuation in the other lamp and hence indicating not only the relative amount of light passing through the negative, but as the negative is running substantially uniform, the fluctuation in the lamps.

The circuit of Fig. 8 is substantially the same as that of Fig. 3 and hence need not be described in detail, except that the output circuit is used for operating a relay for control purposes whereas Fig. 3 the output circuit operates a meter 35.

The manner of using my cine-spectrometer in printing is substantially as follows:

In the installation of Fig. 6, the printing lamp would preferably be kept at a constant voltage and thus project a more or less uniform quantity of light through the negative and reflected from the mirror 54 on the photo-electric cell. As the film changes in density this is recorded on the meter and as the printing lamps are generally provided with an iris type of light opening, this may be varied to either increase or decrease the amount of light shining through the negative on to the positive film or else the voltage of the light circuit may be changed to increase or decrease same. These features are intended to be manually controlled or automatically controlled.

Moreover, by means of a table or chart prepared in accordance with the meter readings, the iris and the voltage of the light circuit may be set to give the desired printing as has been ascertained by prior experiment and the empirical tables or charts.

In Fig. 9 I show a mounting for my cine-spectrometer particularly suitable for reading the reflected light from a theatre screen. The light from a projector would be thrown on the screen preferably without the interposition of a film and a reading obtained These readings vary greatly in different theatres in accordance with the type of screen used indicating the reflective power and hence to a certain extent the degree in which a picture will be visible thereon. Therefore by means of suitably prepared tables the voltage of the circuit for the light from the projector may be changed in order to give the proper light.

Another procedure is to project the light through a film and then read the reflected quantity of light and by means of a suitable definition of projector light value accompanying the film adjust the projecting lamp to correspond.

By obtaining the reflective value of screens in theatres and by testing films for projection to obtain their transparency value it will be possible to standardize the films to a greater extent than is now the case as when a film is released a specification will accompany same stating the power of lamp required for different distances of projection and the type of screen required to give reasonably standard effects.

In describing the manner of using my cine-spectrometer in taking photographs I have referred to a manual control of the iris, however, it will be a relatively simple matter to control the iris automatically. Instead of using a meter an electric relay could be utilized. This relay through electrical mechanism opens and closes the iris in accordance with the change in light values of the scene being taken.

It will be apparent that my cine-spectrometer may be used for a great many features in the moving picture industry such as in trick photography, double exposure, photographing through glass screens or the like. Moreover, it has been found that paints are required to be matched and that this is a difficult operation on account of the different photographic effects of apparently somewhat similar colors. Therefore with the cine-spectrometer I can obtain practically duplicate paints for different scenes at different times and different plates.

In describing the printing of pictures I show a method of obtaining readings to determine the transparency value of the negative and show how the printing lamp could be varied to give substantially standard positives from a varying negative. This can also be arranged to be done automatically by utilizing a relay instead of the meter and changing the voltage of the lamp in accordance with the changing intensities of light required. Also the iris of the printing machine may be varied automatically in accordance with the changing conditions of the negative.

The cine-spectrometer would therefore find uses in testing the actinic value of different lamps or where arc lamps are used for testing the proper arc to obtain the best value for photographic purposes or for projecting pictures. Generally it may be stated that the cine-spectrometer may be utilized for testing light from a direct source or reflected or transmitted through such material as a film or the like.

It is believed from the above that many other uses of my cine-spectrometer will be apparent both connected with the motion picture industry and in other lines. Such changes in adaptation of my invention will be within the spirit thereof as set forth in the description, drawings and claims.

It is to be understood that where the photo-electric cell is used in connection with a camera, that it may be positioned to receive the light which falls on some surface on which the camera lens would form an image, whether this be on a ground glass, translucent material, a reflecting surface or transparent material.

By substitution of an electric relay for the meter 35, a camera iris may be automatically controlled, the iris being operated by suitable electrical mechanism. Also where electric motor driven cameras are utilized the operation of the camera may be controlled by such a relay.

It will also be understood that the lamps 50 and 55 of Fig. 7 may be arranged in series as illustrated, or parallel. The printing lamp is controlled by the indication of the effected light on the photo-electric cell from the lamp 55.

Having described my invention, what I claim is:

1. In combination with, a camera having a transposable lens adapted in one position to photograph on a film, a photo-electric cell positioned to receive focused light through the same lens in another position, sources of electric power for the cell and for amplifying the current therethrough, and means to register the current through the cell.

2. In a method of taking motion pictures focusing the lens of a camera on a scene to be depicted, transposing the same lens and focusing exactly the same scene on a photo-electric cell, by the electric reaction of the cell determining the light value of the scene, again transposing the same lens for photography, and regulating the action of the camera and photographing through the same lens in accordance with the determination of the light value.

3. In combination with a camera having a rotatable turret mounted on a magazine with a plurality of lenses on the turret, said lenses being shiftable to photograph on a film in the magazine, a photo-electric cell supported in relation to the turret whereby the lenses may be shifted from a photographic position to a position to transmit light to the cell, and electrical means to operate with the cell to determine the light values of the scenes focused on the cell.

4. In a method of taking motion pictures comprising focusing a lens which is relatively movable in regard to the camera with which said lens operates on a scene to be depicted, focusing exactly the same scene by the same lens on a photo-electric device and by the electrical reaction of the said device determining the light value of the scene, then relatively shifting the camera and the lens to utilize the lens in exactly the same position, focused on exactly the same scene as the focus on the photo-electric device for photographing the said scene, and in such photography utilizing the determined light value of the scene.

5. In an apparatus for taking motion pictures, the combination of a camera having a camera box with a film therein and a rotatable turret having a lens, said lens in one position transmitting light into the box and in another position out of the box, and said lens being adaped to focus on a scene to be depicted, whereby the image of said scene may be visualized outside of the camera box or depicted on the film in the camera box, a photo-electric cell, means to support said cell in the focus of the scene outside of the camera box, electrical means cooperating with said cell to determine the light values of the said scene, and means operable in connection with the camera and the camera box to photograph exactly the same scene, utilizing the determined light values.

6. In an apparatus for taking motion pictures, a camera having a laterally slidable camera box and a rotatable turret having a lens, the lens having means for focusing a scene to be depicted to give a visual image outside of the box or an image on the film in the box by relatively sliding the box and rotating the turret, a photo-electric cell, means to support said cell in relation to a lens outside of the box to receive light from the same scene, an electrical means cooperating with the cell to determine the light value of such scene, and means cooperating with the lens to photograph the scene, utilizing the determined light value.

In testimony whereof I have signed my name to this specification.

R. E. NAUMAN.